United States Patent [19]

Timmann

[11] Patent Number: 4,746,406
[45] Date of Patent: May 24, 1988

[54] PYROLYZING PLASTIC OR RUBBER WASTES

[75] Inventor: Hinrich Timmann, Hamburg, Fed. Rep. of Germany

[73] Assignee: Brown, Boveri & Cie AG, Mannheim, Fed. Rep. of Germany

[21] Appl. No.: 945,299

[22] Filed: Dec. 19, 1986

[30] Foreign Application Priority Data

Dec. 23, 1985 [DE] Fed. Rep. of Germany ....... 3545954

[51] Int. Cl.⁴ ...................... C10B 47/24; C10B 53/00
[52] U.S. Cl. .................................. 201/25; 48/209;
    201/29; 201/30; 201/31; 585/241
[58] Field of Search ............... 201/2.5, 25, 29, 30,
    201/31, 33, 45; 585/240, 241, 804; 48/209;
    55/23, 27, 80; 208/340

[56] References Cited

U.S. PATENT DOCUMENTS

| | | | |
|---|---|---|---|
| 2,214,368 | 9/1940 | Greensfelder et al. | 55/23 |
| 3,174,926 | 3/1965 | Walker et al. | 308/340 |
| 3,489,678 | 1/1970 | Moon et al. | 208/340 |
| 3,970,524 | 7/1976 | Funk | 201/30 |
| 4,082,615 | 4/1978 | Komuro et al. | 201/2.5 |
| 4,203,804 | 5/1980 | Janning et al. | 201/2.5 |
| 4,206,186 | 6/1980 | Holter et al. | 201/2.5 |
| 4,284,616 | 8/1981 | Solbakken et al. | 201/2.5 |

Primary Examiner—Barry S. Richman
Assistant Examiner—Joye L. Woodard
Attorney, Agent, or Firm—Herbert L. Lerner; Laurence A. Greenberg

[57] ABSTRACT

Pyrolytic reprocessing of plastic, rubber, or other hydrocarbon materials in which the resultant pyrolysis gas is brought in a cooling stage to a temperature just above the freezing point of water and to a pressure of approximately 0.8 to 1.4 bar of overpressure. The resultant condensate is then separated and heated to a normal storage temperature and the super atmospheric pressure on the condensate reduced to atmospheric pressure. The gas produced thereby comprising $C_4$ hydrocarbon compounds is supplied to the pyrolysis process as special product gas. By means of this provision, the proportion of aromatic compounds in the pyrolysis gas is raised substantially.

4 Claims, 2 Drawing Sheets

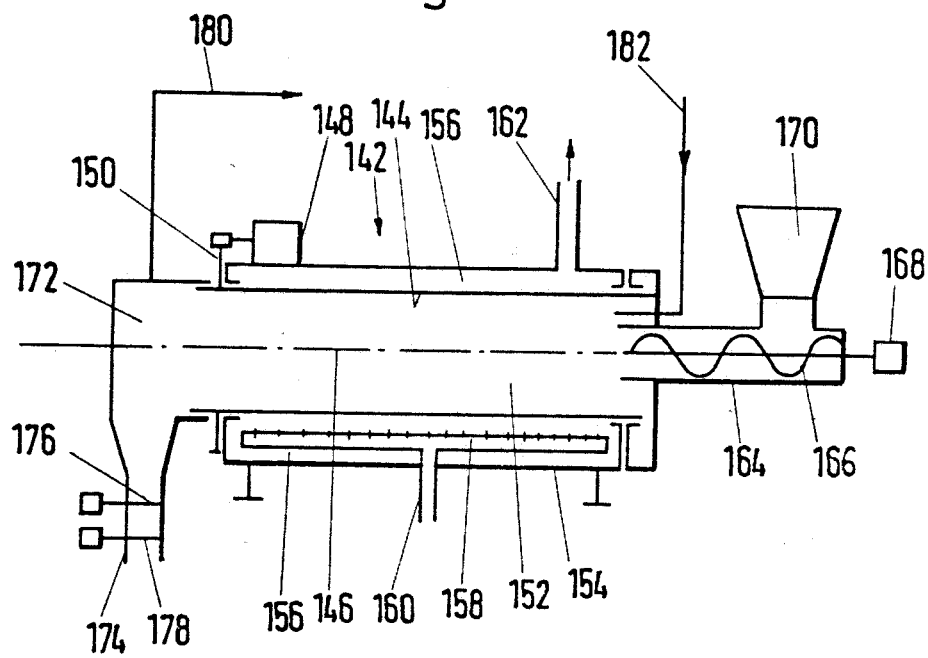

4,746,406

PYROLYZING PLASTIC OR RUBBER WASTES

BACKGROUND OF THE INVENTION

1. Field of the Invention

The invention relates to a method for pyrolytic reprocessing of starting material containing plastic, rubber, other hydrocarbon materials and the like, such as used rubber, old tires and/or plastic waste, in which the pyrolysis gas produced during pyrolysis is cooled, the resultant condensate is separated and the remaining product gas is utilized and/or processed further.

2. Description of the Prior Art

Among other substances, usable product gases are produced in the pyrolysis of hydrocarbon material, in particular old motor vehicle tires. In this connection, U.S. Pat. No. 4,203,804 is expressly incorporated by reference. The product gases are the more valuable, the higher the proportion of aromatic compounds (aromatic hydrocarbons). These aromatic compounds, such as benzene, are particularly suitable candidates for further processing or for use as a basic material in the chemical industry.

SUMMARY OF THE INVENTION

The invention therefore takes the known method and its object is to raise the proportion of aromatic compounds in the product gas, with simple means and at favorable cost. A further object is to lessen the number of components in the product gas, and at the same time to facilitate producing them in the purest possible form.

With the foregoing and other objects in view, there is provided in accordance with the invention a method for the pyrolytic reprocessing of starting material containing plastic, rubber, other hydrocarbon materials and the like, in particular waste material such as used rubber, old tires and plastic waste, wherein the starting material is decomposed in a pyrolysis zone and the pyrolysis gas produced in the pyrolysis is cooled, the resultant condensate is separated and the remaining product gas is utilized or processed further, the combination therewith of subjecting at least a partial flow of the pyrolysis gas in a cooling stage to a temperature just above the freezing temperature of water and to a pressure of approximately 0.8 to 1.4 bar of overpressure and producing a cold condensate, separating the cold condensate produced in the cooling stage, reducing the pressure on the cold condensate to a lower pressure, and heating the condensate to a normal storage temperature on the order of typical ambient temperatures, said reducing of pressure on the condensate and said heating of the condensate causing liberation of gas designated special product gas from the condensate, and returning the special product gas to the pyrolysis zone.

Other features which are considered as characteristic for the invention are set forth in the appended claims.

Although the invention is illustrated and described herein as embodied in a method for pyrolytic reprocessing of starting material, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 2 shows a horizontal hollow-cylindrical retort or drum which is a variant embodiment of the pyrolysis reactor of the system according to FIG. 1.

DESCRIPTION OF THE PREFERRED EMBODIMENTS

Figure 1:
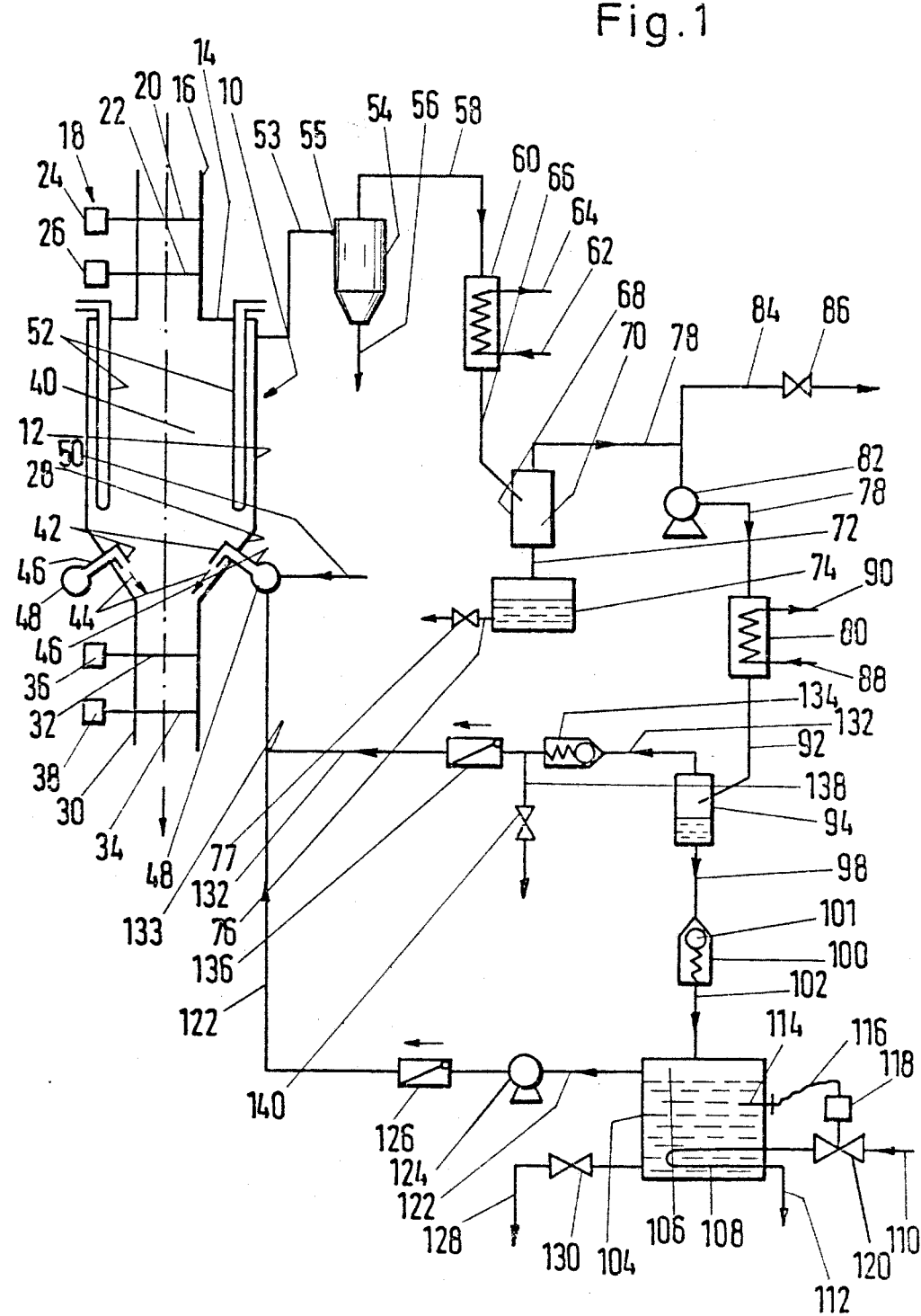
FIG. 1 is a schematic illustration of a pyrolysis system suitable for performing the method according to the invention.

According to the invention at least a partial flow of the product gas produced by pyrolysis of the starting material is brought, in a cooling stage, to a temperature just above the freezing point of water and to a pressure of approximately 0.8 to 1.4 bar of overpressure, i.e. approximately 0.8 to 1.4 bar above atmospheric pressure, by separating the cold condensate produced in the cooling stage, reducing the superatmospheric pressure on the cold condensate to a lower pressure, preferably atmospheric pressure, and heating the cold condensate to a normal storage temperature on the order of typical ambient temperatures; and returning the thereby liberated gas, as a special product gas, to the pyrolysis process. The storage temperature is a temperature of approximately 18° to 30° C., preferably about 25° C.

In the method according to the invention, use is made of the fact, known per se, that the formation of aromatic compounds is promoted very markedly by the presence of gaseous unsaturated $C_4$ hydrocarbon compounds, such as butene $C_4H_8$ and/or butadiene $C_4H_6$, in the pyrolysis. It has been demonstrated that by cooling the pyrolysis gas to temperatures just above the freezing point of water—to prevent ice from forming, the temperature should not drop below the freezing point of water—a cold condensate is produced, in the form of a light product oil, that is, a light oil. This light product oil contains virtually all the $C_4$ hydrocarbon compounds of the cooled pyrolysis gas together with benzene and other light oil components. The ensuing reduction of the overpressure to which the cold condensate is subjected has the effect that the $C_4$ hydrocarbon compounds for the most part return to the gas phase. These gaseous $C_4$ hydrocarbon compounds are then introduced into the pyrolysis process, where they promote the formation of aromatic compounds. The benzene dissolved in the cold condensate remains largely in the liquid phase during the pressure relief process. This benzene is very valuable and can be processed further. The increase in the proportion of aromatic compounds in the pyrolysis gas effected by the invention also substantially increases their proportion in the cold condensate, thereby making the pyrolysis process more economical. The pressure relief (reduction in pressure on the cold condensate, usually by passage to a zone of lower pressure) of the cold condensate is effected to an overpressure of approximately 0.1 to 0.3 bar; preferably the pressure is reduced to atmospheric pressure.

A preferred further feature of the invention is that the pyrolysis gas, before entering the cooling stage, is cooled in a precooling stage to a temperature on the order of approximately 100°-150° C., and the resultant hot condensate is removed. By the removal of the hot condensate, which appears in the form of a hot oil, tarry and powdery components are largely removed from the process. This has the advantage that these components, which have a highly emulsifying effect on oil-water mixtures, can no longer disturb the separation of oil and water in the cold condensate in the cooling stage. This is important, because as a result of the severe cooling of the pyrolysis gas in the cooling stage, not only light oil but also water is produced.

It is most favorable if the pyrolysis gas is cooled in the precooling stage to a temperature of approximately 110°–130° C., preferably approximately 120° C. This keeps the expenditure for coolant as low as possible, without impairing the extraction of the tarry and powdery components. Furthermore, the resultant hot condensate is water-free.

It is also advantageous that the pyrolysis gas is brought to an overpressure of approximately 0.9 to 1.2 bar, preferably approximately 1 bar.

A temperature of approximately 0.5° to 2° C., preferably approximately 1° C., is used as the temperature just above the freezing point of water. A sufficient distance from the freezing point of water is thereby adhered to, so that the extent of cooling can be monitored with simple thermostatic regulating devices.

To assure a reliable transition of the $C_4$ hydrocarbon compounds of the cold condensate to the gas phase, it is recommended that the storage temperature to which the cold condensate is heated is approximately 20° to 30° C. preferably 25° C.

If the pyrolysis is performed in a fluidized bed that is maintained by the delivery of a fluidizing gas, it is advantageous for the special product gas containing a high proportion of $C_4$ hydrocarbon compounds to be delivered together with the fluidizing gas to the pyrolysis process. It is recommended that the fluidizing gas be blown in from top to bottom, in the lower region of the pyrolysis reactor in the vicinity of the side wall, with a blower device.

If pyrolysis is performed in a rotatable hollow-cylindrical retort, it is most suitable for the special product gas to be introduced into the retort in the vicinity of the inlet for the hydrocarbon material. In both the above-mentioned cases, intimate mixing with the products of pyrolysis is attained and the formation of the aromatic compounds is promoted by suitable selection of the delivery of the special product gas.

As will be appreciated from the above discussion, the method according to the invention does not entail any major additional expense. This is particularly true if the various cooling stages are combined into a unit, in the usual manner.

The invention will be described in further detail below in terms of exemplary embodiments, taken in conjunction with the drawings.

In the ensuing description, components that are not essential to the method according to the invention are not described or shown.

The pyrolysis system of FIG. 1 has a pyrolysis reactor 10, which operates with a fluidized bed, embodied by fine granular fluidized bed material, such as sand. The pyrolysis reactor 10 shown in central vertical section has a vertical hollow-cylindrical housing 12. A central supply tube 16 for the starting material, which likewise extends vertically, is provided on the cap 14 of the housing. The supply tube 16 is provided with an inlet gate 18, comprising two spaced-apart shutoff slide valves 20 and 22 disposed one above the other. These shutoff slide valves can be actuated by control motors 24 and 26, respectively.

The lower portion 28 of the housing 12 tapers in funnel-like fashion and merges with the central outlet tube 30 for pyrolysis residues. The outlet tube 30 extends vertically and is also provided with two spaced-apart shutoff slide valves 32 and 34, respectively, which are disposed one above the other and form an outlet gate. Control motors 36 and 38, respectively, are provided for actuating these shutoff slide valves 32, 34.

In the lower region 28 of the interior 40 of the pyrolysis reactor, a multiplicity of blower outlets 42 is provided, through which a gaseous fluidizing medium such as nitrogen, is blown to form the fluidized bed in the interior 40. The blower outlets 42 are disposed in the immediate vicinity of the inner wall and point downward toward the outlet tube 30, so that the fluidizing medium is blown in downward along the inner wall of the region 28. The blowing direction is indicated by arrows 44. The blower outlets 42 are disposed on the ends of tubes 46, which penetrate the funnel-like region 28 approximately at right angles. The blower outlets 42 may be embodied as simple openings, but it is also possible for them to be embodied in the form of nozzles. The tubes 46 are also connected to a horizontal ring line 48, which surrounds the lower region 28. The ring line 48 is supplied with the fluidizing gas through the pipeline 50 from a suitable reservoir, not shown in the drawing.

Also provided in the interior 40 is a multiplicity of vertically extending, straight heating tubes 52, extending to the vicinity of the funnel-like region 28 or the blower outlets 42. These heating tubes serve to generate the pyrolysis temperature and are therefore provided with a gas heater, not shown. The heating tubes 52 extend in the vicinity of the cylindrical inner wall of the housing 12 and are distributed at regular intervals over the circumference. The heating tubes are passed into the interior 40 through the circular-annular portion of the cap 14 that connects the housing 12 with the supply tube 16.

A pipeline 53 connecting the interior 40 with the gas inlet fitting 55 of a cyclone separator 54 is attached to the upper cylindrical region of the housing 12. A line 56 for removing the separated solids is provided on the lower end of the cyclone separator. A gas line 58 leads from the upper end of the cyclone separator to the precooling stage 60. The precooling stage comprises at least one heat exchanger. Coolant in the form air or water is supplied to and removed from the heat exchanger through the lines 62 and 64, respectively. As may be seen in FIG. 1, the coolant flows through the cooling tubes of the heat exchanger countercurrent to and in indirect heat exchange with the flow of gas entering through line 58.

A pipeline 66 leads with a descending gradient from the lower end of the precooling stage 60 to an upright cylindrical hot separator 68, in which the supplied mixture of hot condensate and pyrolysis gas is separated. To this end, the pipeline 66, oriented obliquely downward, discharges into the interior 70 of the hot separator 68. The hot condensate drops downward and is carried through the line 72 to a closed hot condensate vessel 74, from which it can be removed through the pipeline 76 having a shutoff device 77 incorporated in it. In the hot separator 68, the gas, which is now known as product gas, flows upward and is supplied through the line 78 to the cooling stage 80. A gas pump or gas compressor 82 is incorporated into the line 78, compressing the supplied product gas to an overpressure of approximately 1 bar. In addition, a further or branch product gas line 84 is connected to the line 78 upstream of the gas pump 82 and is provided with a shutoff device 86.

The cooling stage 80 is similar in structure to the precooling stage 80 and has at least one heat exchanger. The coolant is delivered and removed through the lines 88 and 90, respectively, the coolant being passed countercurrent to the incoming product gas through the heat exchanger. A cooling brine is preferably used as the coolant and is brought by a cooling device, not shown in FIG. 1, to a temperature of at least $-3°$ to $-5°$ C.

The mixture of cold condensate and gas that is produced in the cooling stage 80 is supplied through the condensate line 92 to a cold separator 94, which has the same structure as the hot separator 68. The extracted cold condensate is delivered through the line 98 to a pressure maintenance valve 100. This pressure maintenance valve 100 has a loaded spring shutoff ball 101, and it admits only enough cold condensate to maintain a pressure set at the valve, in the present example approximately 1 bar, in the components 78, 80, 92, 94, 98. This pressure is generated by the gas pump 82. The cold condensate that is admitted by the pressure maintenance valve 100 flows through the pipeline 102 to a closed vessel 104, where it is collected. Since approximately atmospheric pressure prevails in the interior 106 of the vessel 104, that is, the pressure of the ambient air, the cold condensate undergoes a pressure relieve or release, i.e. a pressure reduction from its overpressure of 1 bar to ambient pressure as it passes through the pressure maintenance valve 100.

In the vicinity of the bottom of the vessel 104, a heater 108, suitably in the form of a pipe coil, is provided, to which a heating medium, such as hot water, is supplied through the line 110 and from which the heating medium is removed through the line 112. Above the heater 108, a temperature sensor 114 is disposed in the region of the interior 106 in which cold condensate is located. The temperature sensor acts upon the control motor 118 of a regulating valve 120 via a control line 116. This regulating valve 120 is disposed in the line 110, so that the supply of heating medium to the heater 108 is regulated such that the cold condensate is heated to the temperature of 25° C. that is set at the temperature sensor 114.

The upper region of the interior 106, which contains gas, communicates through a special product gas line 122 with the ring line 48 of the pyrolysis reactor 10. A gas pump 124 and a reflux inhibitor in the form of a check valve 126, in that order as viewed in the direction of gas flow, are incorporated into the special product gas line 122. The check valve 126 prevents a reflux (return) of gas from the ring line 48 to the interior 106. A drain line 128 with an incorporated shutoff device 130 is connected in the vicinity of the bottom of the vessel 104. The cold condensate, and optionally residues such as water, can be removed from the vessel 104 through this drain line.

A bypass line 132 connected to the gas outlet of the cold separator 94 discharges at the site 133 into the special product gas line 122, upstream of the ring line 48. A further pressure maintenance valve 134 and a further reflux inhibitor, in the form of a further check valve 136, in that order in the flow direction, are disposed in series with one another in this bypass line 132. The further pressure maintenance valve 132 is identical in both its structure and its mode of operation to the pressure maintenance valve 100. Between the further pressure maintenance valve 134 and the further check valve 136, a gas line 138 having an incorporated shutoff device 140 is connected to the bypass line 132. Excess gas can be removed by means of this gas line 138. Excess gas can also be removed through the product gas line 84 and used in the same manner as the gas from the gas line 138, for instance as fuel gas. In particular, this fuel gas can be used for heating the heating tubes 52.

During operation, a fluidizing gas, nitrogen, for example, is delivered through the pipeline 50 to the blower outlets 42 via the ring line 48 and the tubes 46. The fluidizing gas then flows downward (arrows 44) along the inner wall of the funnel-like region 28 and fluidizes the fine granular fluidization medium, such as sand, that is present in the interior 40 and forms a fluidized bed, not shown in the drawing. The shutoff slide valves 20, 22, 32, 34 are closed during this time. Once the fluidized bed has been heated by the heating tubes 52 to a temperature of approximately 500° to 850°C., the starting material, in particular old tires, is introduced into the interior 40 through the inlet gate 18. To this end, the shutoff slide valve 20 is first opened, and with the shutoff slide valve 22 closed the old tires are introduced into the supply tube 16 as far as the shutoff slide valve 20. The shutoff slide valve 20 is now closed and the lower shutoff slide valve 22 is opened, so that the old tires fall into the interior 40 and are caught in the fluidized bed and subjected to pyrolysis. The shutoff slide valves 20 and 22 are now closed. The opening and closing of these shutoff slide valves is done with the aid of the control motors 24 and 26, respectively. The pyrolysis runs its course without the addition of air.

The solid residues from the pyrolysis are removed from the interior 40 with the aid of the shutoff slide valves 32 and 34, which form an outlet gate. To this end, the shutoff slide valve 32 is opened first, with the aid of the control motor 36, so that these residues drop onto the shutoff slide valve 34. After the shutoff slide valve 32 has been closed, the lower shutoff slide valve 34 is opened by the control motor 38, so that the residues drop to the outside through the outlet tube and can be removed. After this operation, the shutoff slide valve 34 is closed again. In the manner described above, the starting material that is to be decomposed by pyrolysis can be delivered and removed continuously, with no or insignificant escape of gas from the interior 40.

The pyrolysis gas produced in the thermal decomposition of old tires is at a temperature of approximately 400°–800° C. and is conducted to the cyclone separator 54 through the pipeline 53. Here, solid particles entrained by the gas are separated and removed from the cyclone separator through the line 56. The cleaned pyrolysis gas from the cyclone separator 54 flows through the gas line 58 to the precooling stage 60. The pyrolysis gas is cooled down by means of the coolant supplied through the line 62 in the precooling stage 60 to a temperature of preferably approximately 120° C. In this process some of the gas condenses, and the result is a water-free hot condensate, which together with the remaining gas component discharges through the pipeline 66 to the hot separator 68.

In the interior 70 of the hot separator 68, hot condensate and gas are separated. The hot condensate is delivered through the line 72 to the hot condensate vessel 74, where it is collected. This condensate can be sent to storage or other further use by removing it through the pipeline 76 having the incorporated shutoff device 77. The hot condensate contains almost no $C_4$ compounds and almost no benzene, since these components remain in the gas phase.

The gas that is separated in the hot separator 68 from the hot condensate, which is now called product gas, is delivered through the line 78 to the gas pump or the gas compressor 82. A portion of the product gas may, if desired, be removed through the product gas line 84, with only a portion of the product gas sent to the gas compressor 82. In the gas compressor, the product gas is brought to an overpressure of preferably 1 bar, with respect to the ambient atmosphere, and then supplied through the line 78 to the cooling stage 80. Here the product gas is cooled to a temperature of preferably 1° C. To this end, a suitably cold coolant, such as cooling brine having a temperature of approximately −5° C. is delivered to the heat exchanger of the cooling stage. During the cooling in the cooling stage 80, the product gas largely condenses, and the result is a cold condensate that contains a light product oil (light oil) and water. The $C_4$ hydrocarbon compounds of the gas and the aromatic compounds such as benzene are contained in the light product oil. The cold condensate, together with the remaining uncondensed product gas, is delivered through the condensate line 92 to the cold separator 94, in which the liquid and gaseous components are separated.

The cold condensate separated in the cold separator 94 flows through the line 98, the pressure maintenance valve 100 and the pipeline 102 to the vessel 104. The gaseous components, in contrast, flow to the ring line 48 through the bypass line 132 having the further pressure maintenance valve 134 and the check valve 136 incorporated in it. The pressure maintenance valves 100 and 134 admit only enough cold condensate or gas so that the pressure of 1 bar, which is generated by the gas pump 82, is maintained in the cooling stage 80 and in the cold separator 94. This pressure may be varied as needed by changing the settings of the pressure maintenance valves 100 and 134.

Since the interior 106 of the vessel 104 is at a lower pressure than the cold separator 94, preferably at atmospheric pressure or in other words the pressure of the ambient air, the cold condensate at 1 bar of overpressure is reduced to this lower pressure or atmospheric pressure as it flows through the pressure maintenance valve 100. The cold condensate collected in the interior 106 is heated by the heater 108 to a temperature of preferably 25° C. To this end, a heat carrier is supplied through the line 110 to the pipe coil of the heater 108. The inflow is set by means of the regulating valve 120 and the control motor 118 such that the temperature of the cold condensate, which is detected by the temperature sensor 114, is kept at the set value of preferably 25° C.

By releasing the pressure on the cold condensate in the pressure maintenance valve 100 and by heating the cold condensate in the vessel 104 to approximately 25° C. virtually all the $C_4$ hydrocarbon compounds that are contained in the cold condensate change to the gaseous state (gas phase). These gaseous $C_4$ hydrocarbon compounds collect in the upper region of the interior 106, while the liquid residues remain in the interior 106 and can be removed through the drain line 128. The gaseous $C_4$ hydrocarbon compounds, which are called special product gas, are removed from the upper region of the interior 106 via the special product gas line 122 and delivered to the ring line 48 with the aid of the gas pump 124. In the ring line, the special product gas is mixed with the fluidizing gas and delivered with it to the pyrolysis process. The check valve 126 prevents gas from flowing back into the interior 106. The special product gas is largely water-free.

By means of the gaseous $C_4$ hydrocarbon compounds introduced into the pyrolysis process, that is, into the hot fluidized bed, a gas is produced that has a very high proportion of aromatic hydrocarbon compounds (aromatic compounds), or in other words the formation of aromatic compounds is promoted. These aromatic compounds make the pyrolysis gas particularly valuable and thus increase the economy of the entire pyrolysis method.

By cooling the pyrolysis gas down in the precooling stage 60 and extracting the resultant hot condensate, which appears in the form of a hot oil, tarry and powdery components are largely removed and are collected together with the hot condensate in the hot condensate vessel 74. This has the advantage that these tarry and powdery components, which have a highly emulsifying effect on oil-water mixtures, can no longer deleteriously affect the separation of oil and water in the cold condensate. The oil component of the cold condensate in the vessel 104 is therefore readily separated from the water component of the cold condensate. The oil component, which contains a very large amount of benzene, can therefore be removed without difficulty from the vessel 104, for example through the drain line 128; the same applies to the water, if its removal is required.

Excess pyrolysis gas can be removed from the system through the product gas line 84 and/or the gas line 138. The gas from the gas line 138 is the most valuable, because it is largely free of components capable of condensing at ambient temperature. The gas from the product gas line 86 or from the gas line 138 can be used for heating the heating tubes 52 or may serve as raw material for further products.

In the drawing, the various cooling stages are shown as separate elements for the sake of clarity. It will be understood that the energy budget can be optimized by uniting these elements spatially. This is not shown in the drawing. Other components that are not essential to the method described are also omitted from the drawing and not described herein.

In FIG. 2, a variant embodiment of the pyrolysis reactor of the system of FIG. 1 is shown by itself. The pyrolysis reactor 142 has a horizontal hollow-cylindrical retort or drum 144. The longitudinal axis 146 of the drum is suitably inclined to the horizontal by an angle of approximately 3° to 15°, with the outlet of the drum located lower than its inlet. The drum 144 is rotated slowly about its longitudinal axis 146 by a motor 148 with the aid of a suitable gear wheel drive 150. The drum 144 is also surrounded by a non-rotatable housing 154, forming an interspace 156 on all sides. A heater 158 is provided in the interspace 156, in the present case comprising gas burners, which are supplied with fuel gas through the line 160. This fuel gas may comprise pyrolysis gas. The flue gases produced during combustion are removed through the exhaust pipe 162 at the top of the housing 154.

A supply apparatus 164 for the material that is to be decomposed by pyrolysis is connected centrally to the interior 152 on the right-hand end. The supply apparatus has a conveyor worm 166, which is driven by a motor 168. The conveyor apparatus 164 is provided with a hopper 170 through which the starting material is delivered to the conveyor worm 166. On the left-hand end, the drum 144 discharges into a transitional space 172, to which an outlet pipe 174 is connected at the bottom. Two shutoff slide valves 176 and 178 are disposed spaced apart, one above the other, and each is driven by a control motor. The embodiment and the purpose of these shutoff slide valves are identical to those of the shutoff slide valves 32, 34 of FIG. 1. A pipeline 180 is attached in the upper region of the transitional space 172, leading to the gas inlet fitting 55 of the cyclone separator 54 of FIG. 1; this pipeline 180 is equivalent to the pipeline 53 of FIG. 1. On the right-hand end of the drum 144, in the region where the supply apparatus 164 is connected, the special product gas line 182 discharges into the interior 152. This special product gas line 182 is equivalent to the special product gas line 122 of FIG. 1 and connects the transitional space 172 to the location 133 in the special product gas line 122.

During operation, the drum 144 is set to slow rotation about longitudinal axis 146, for example 5 to 10 revolutions per minute, by the motor 148. At the same time, the drum 144 is brought by the heater 158 to a temperature of approximately 500° to 850° C. Now the starting material which is to be decomposed by pyrolysis is fed into the hopper 170 introduced by means of the conveyor worm 166 into the interior 152; during this time the shutoff slide valves 176 and 178 are closed. As a result of the inclination of the drum and/or by means of the rotation of the drum effected by the motor 148, the starting material migrates in the interior 152 from the supply apparatus 164 to the transitional space 172, in the course of which it is pyrolytically decomposed. The non-pyrolyzed residual components enter the transitional space 172 and drop downward to the shutoff slide valves 176 and 178. The residual material is discharged through these shutoff slide valves precisely as in the system of FIG. 1 and is removed through the outlet pipe 174. The exhaust gases of the heater 158 are carried through the exhaust pipe 162 to an exhaust stack, not shown.

The pyrolysis gases produced during the pyrolysis enter the transitional space 172 and are directed through the pipeline 180 to the cyclone separator 54 of FIG. 1. From there on, this gas is processed as described in conjunction with FIG. 1. The gaseous $C_4$ hydrocarbons separated from the liquid in the vessel 104 flow through the special product gas line 182 to the right-hand end of the interior 152 of the drum 144. The same applies for the gases from the bypass line 132. The $C_4$ hydrocarbons introduced into the interior 152 of drum 144 promote the formation of aromatic compounds during the process of pyrolysis in the drum 144.

In the above-described exemplary embodiments, the pyrolysis gas was precooled in the precooling stage 60. If it is desirable to dispense with this step, then the cyclone separator 54 is connected on the gas side directly with the gas compressor 82. This is not shown in FIG. 2.

There is claimed:

1. A method for pyrolyzing material containing polastic or rubber waste, comprising; thermally decomposing the material in a pyrolysis zone at substantially atmospheric pressure to produce a pyrolysis gas, cooling the pyrolysis gas to a temperature of approximately 100° to 150° C. so that a part thereof forms a hot condensate, separating the hot condensate from the remainder of the pyrolysis gas, subjecting a flow of the remainder of the pyrolysis gas in a cooling stage to a temperature of approximately 0.5° to 2° C. and to a pressure increase of approximately 0.8 to 1.4 bar and producing a cold condensate, separating the cold condensate produced in the cooling stage, reducing the pressure on the cold condensate to a lower pressure, and heating the cold condensate to approximately 18° to 30° C. at the reduced lower pressure so as to liberate $C_4$ hydrocarbon compounds in gaseous form from the condensate and returning the gaseous $C_4$ hydrocarbon compounds to the pyrolysis zone.

2. A method as defined by claim 1, wherein said lower pressure is atmospheric pressure.

3. A method as defined by claim 1, wherein the pyrolysis zone is a fluidized bed, which is maintained by the supply of a fluidizing gas, and wherein the gaseous $C_4$ hydrocarbon compounds are supplied along with the fluidizing gas to the fluidized bed.

4. A method as defined by claim 3, wherein the fluidized bed is disposed in the lower region of a pyrolysis reactor and bounded by a side wall of the pyrolysis reactor and wherein the fluidizing gas blown in from top to bottom in a lower region of the pyrolysis reactor, in the vicinity of the side wall, with a blower device.

* * * * *

UNITED STATES PATENT AND TRADEMARK OFFICE
CERTIFICATE OF CORRECTION

PATENT NO. : 4,746,406
DATED : May 24, 1988
INVENTOR(S) : Hinrich Timmann

It is certified that error appears in the above-identified patent and that said Letters Patent is hereby corrected as shown below:

In the title page, item (54), and column 1 title,

"PYROLYZING PLASTIC OR TUBBER WASTES"

should read:

"METHOD FOR PYROLYZING PLASTIC OR RUBBER WASTES"

Signed and Sealed this

Thirty-first Day of October, 1989

Attest:

DONALD J. QUIGG

Attesting Officer

Commissioner of Patents and Trademarks